(12) United States Patent
Prodzenko (10) Patent No.: US 11,852,436 B2
(45) Date of Patent: Dec. 26, 2023

(54) MOUNT FOR ADAPTING WEAPONS TO A VIRTUAL TRACKER

(71) Applicant: Street Smarts VR, New York, NY (US)

(72) Inventor: Greg Prodzenko, Philadelphia, PA (US)

(73) Assignee: Street Smarts VR, Inc., New York, NY (US)

( * ) Notice: Subject to any disclaimer, the term of this patent is extended or adjusted under 35 U.S.C. 154(b) by 287 days.

(21) Appl. No.: 17/412,836

(22) Filed: Aug. 26, 2021

(65) Prior Publication Data

US 2023/0061207 A1 Mar. 2, 2023

(51) Int. Cl.
| | |
|---|---|
| *F41A 33/00* | (2006.01) |
| *F41A 9/82* | (2006.01) |
| *F41G 3/26* | (2006.01) |
| *G06F 3/01* | (2006.01) |

(52) U.S. Cl.
CPC ............... *F41A 9/82* (2013.01); *F41A 33/00* (2013.01); *F41G 3/26* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 5,641,288 A | 6/1997 | Zaenglein | |
| 11,144,112 B2 * | 10/2021 | Zhu | G06T 19/20 |
| 11,346,630 B2 * | 5/2022 | Jarrard | G09B 9/003 |
| 11,422,764 B1 * | 8/2022 | Kwong | G06F 3/14 |
| 2004/0201857 A1 | 10/2004 | Foxlin | |
| 2008/0127538 A1 * | 6/2008 | Barrett | F41A 19/01 |
| | | | 434/24 |
| 2009/0325699 A1 * | 12/2009 | Delgiannidis | A63F 13/42 |
| | | | 463/32 |
| 2010/0035441 A1 | 2/2010 | Rohrbach | |
| 2020/0408480 A1 * | 12/2020 | Kur | G01P 13/00 |
| 2021/0018292 A1 | 1/2021 | Formwalt | |
| 2023/0158399 A1 * | 5/2023 | Andriychenko | A63F 13/26 |
| | | | 463/2 |

FOREIGN PATENT DOCUMENTS

| | | | |
|---|---|---|---|
| CN | 113442125 A | * | 9/2021 |
| WO | WO-2020019209 A1 | * | 1/2020 |
| WO | WO-2022086361 A1 | * | 4/2022 |

OTHER PUBLICATIONS

PCT International Search Report and Written Opinion for International Application No. PCT/US22/41456, dated Dec. 20, 2022, 7 pages.

* cited by examiner

*Primary Examiner* — Reginald S Tillman, Jr.
(74) *Attorney, Agent, or Firm* — DLA Piper LLP (US)

(57) ABSTRACT

A magnetic tracker mount comprising a tracker interface configured to adapt a weapon to a tracker that facilitates communications between the weapon and a virtual reality computing device. The tracker interface comprising a base plate including a groove comprising a female socket configured to receive a catch plate of the tracker, wherein the groove includes a magnet that attracts to the catch plate. The tracker interface further comprising a pin pad including pins configured to establish signal connections with the tracker, the pins transmitting signals from the weapon to the tracker.

7 Claims, 14 Drawing Sheets

MOUNT FOR ADAPTING WEAPONS TO A VIRTUAL TRACKER

CROSS REFERENCE TO RELATED APPLICATION

This application is related to the following patents and applications, which are assigned to the assignee of the present invention:

U.S. patent application Ser. No. 16/930,050, entitled "MAGAZINE SIMULATOR FOR USAGE WITH WEAPONS IN A VIRTUAL REALITY SYSTEM," filed on Jul. 15, 2020, and U.S. patent application Ser. No. 16/930,060, entitled "A VIRTUAL REALITY SYSTEM FOR USAGE WITH SIMULATION DEVICES," filed on Jul. 15, 2020.

The above identified patents and applications are incorporated by reference herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to a mounting device for a virtual reality tracker, and in particular, a screwless interface for attaching weapons to a virtual reality tracker.

Description of the Related Art

It has long been desired to provide personnel training to improve their skills in aiming and firing shotguns, rifles, handguns, and other weapons. Law enforcement and military training often place trainees into situations that require quick visual and mental assessment of the situation as well as an appropriate response with a weapon. Trainees are often subjected to adverse situations to test their abilities to effectively react.

Traditional training methods in marksmanship and firing tactics for hunters and other sportsmen, police, military personnel, and others, leave much to be desired from the aspects of realism, cost and practicality. Many firing ranges have limited capacity. Moreover, most existing firing ranges do not provide protection for the shooter against the natural elements such as rain or snow. Because of the noise levels normally associated with firing ranges, they are typically located in remote areas requiring people to have to drive to remote locations. The ammunition, targets and use costs for the range, make such training expensive. Furthermore, when live ammunition is used, expense, risks, administrative problems, safety concerns, and government rules and regulations are more burdensome. For training in marksmanship and tactics, it is beneficial to have an indoor range where shooters can fire simulated projectiles against simulated moving targets.

Video games are increasingly more realistic where users may be placed into immersive virtual environments. First-person-view shooting games offer players the ability to perform actions such as walking, crouching, shooting, etc., using a mouse and keyboard. However, these games are usually played in front of a computer where the user is sitting in a chair and are adequate for personnel training. Virtual reality systems may improve gaming experience where the player's movement in the game is dependent on their actions in physical space which makes the game more immersive than a traditional video game. Despite the realism provided by virtual reality systems, players are often provided with game controllers that are either tethered or have the look and feel of toys. As such, existing virtual reality game controllers that are representative guns differ from actual guns in feel and balance, and thus reduces the effectiveness of the training for real life.

There is thus a need to provide improved hardware for virtual reality shooting simulators.

SUMMARY OF THE INVENTION

The present invention provides a magnetic tracker mount. According to one embodiment, the magnetic tracker mount comprises a tracker interface configured to adapt a weapon to a tracker that facilitates communications between the weapon and a virtual reality computing device. The tracker interface comprising a base plate including a groove comprising a female socket configured to receive a catch plate of the tracker, wherein the groove includes a magnet that attracts to the catch plate. The tracker interface further comprises a pin pad including pins configured to establish signal connections with the tracker, the pins transmitting signals from the weapon to the tracker.

The catch plate may comprise ferromagnetic material. The groove may assist with proper alignment and contact of the pin pad with a pogo pin connector of the tracker. The signals may be mapped into commands based on contact connections with corresponding pins on the tracker.

According to another embodiment, the magnetic tracker mount comprises a tracker comprising hardware configured to receive signals from a weapon via a tracker interface and transmit the signals to a virtual reality computing device. The tracker comprises a magnet configured for insertion into a groove of the tracker interface, wherein the groove includes a catch plate that attracts to the magnet. The tracker further comprises a pogo pin connector including a plurality of pins placed in contact with pins on a pin pad of the tracker interface to transfer the signals from the weapon to the tracker. The magnet may be secured to the tracker by at least a screw or a bolt. The plurality of pins may comprise a plurality of spring-loaded pins.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses systems, devices, and methods that employ virtual reality to train police officers or military in the use of weapons like guns or electronic control weapons (e.g., those available from Taser™) in specific scenarios or situations. A trainee may be given an actual weapon or a training weapon that simulates an actual weapon and is connected to a virtual reality system. The trainee may wear goggles or headsets that are connected to the virtual reality system which plays a training scenario. Throughout the training scenario, the trainee's use of his weapon may be tracked and provided to the virtual reality system.

Figure 1:
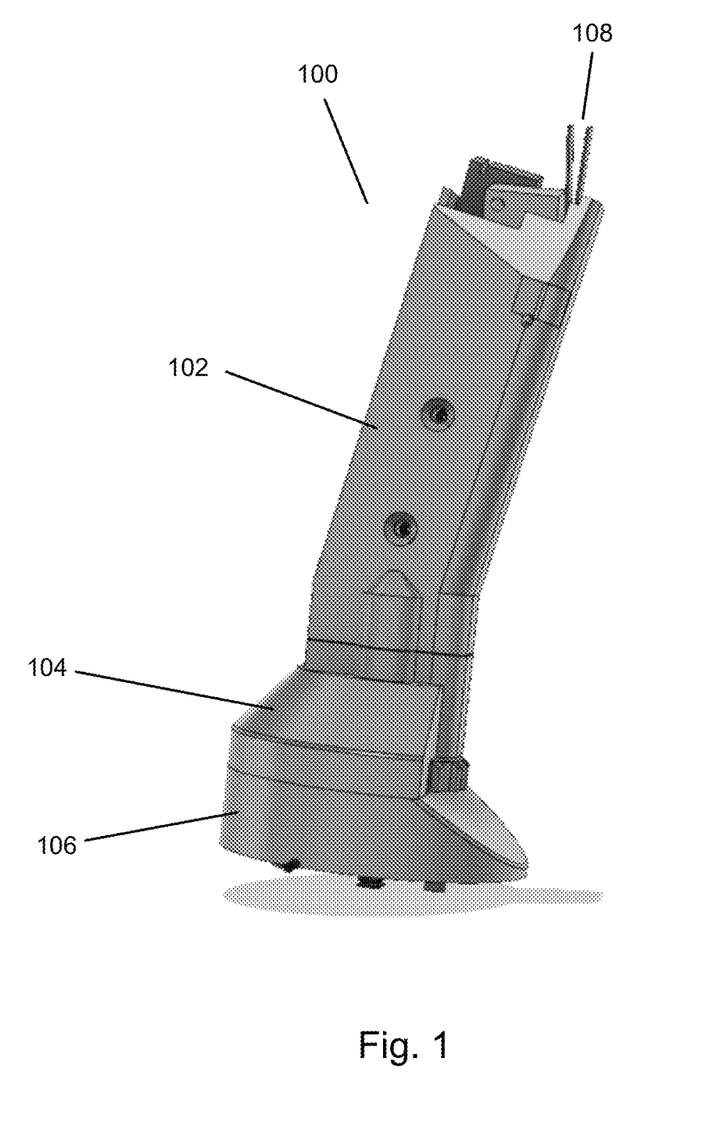
FIG. 1 illustrates a magazine simulator according to an embodiment of the present invention.

FIG. 1 illustrates a magazine simulator according to an embodiment of the present invention. Magazine simulator 100 may be provided to a real gun, such as a Glock handgun, and operates or fires (e.g., virtually) when a trigger of the gun is pulled. The magazine simulator 100 may also be used with replica weapons, such as Airsoft or toy guns. The magazine simulator may be inserted into a magazine well or a magazine inserting portion of a gun, according to an embodiment of the present invention. The magazine simulator 100 may comprise a box magazine 102, a tracker interface 104, and a tracker 106. The box magazine 102 may include a switch 108 that when inserted into a magazine well of a gun, may be articulated with a trigger or firing mechanism of the gun. Switch 108 may comprise one or more tabs, hooks or levers that are connected to electronic circuitry or sensors in box magazine 102. The switch 108 may be actuated by a gun trigger which may then connect an electrical signal from box magazine 102 to tracker interface 104. Box magazine 102 may further include weights for modifying the balance and feel of a gun when inserted. In one embodiment, force feedback may be provided by compressed gas or a weight controlled by servo motors within box magazine 102 for enhanced realism while firing (based on the articulations of the switch).

Figure 2:
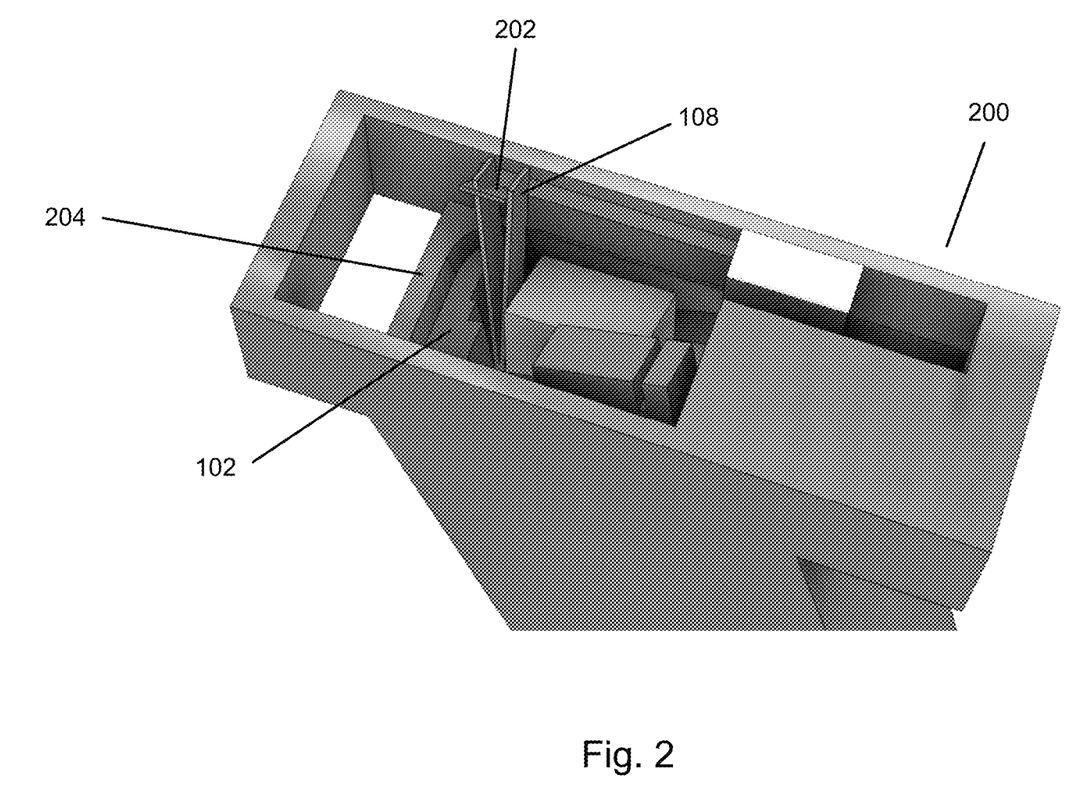
FIG. 2 illustrates a cutaway view of a handle portion of a gun including a magazine simulator according to an embodiment of the present invention.

FIG. 2 presents a cutaway view of a handle portion of a gun including a magazine simulator according to an embodiment of the present invention. The box magazine 102 can be inserted into magazine well 204 of gun 200. When inserted, switch 108 may be configured with trigger connection 202. Trigger connection 202 may be connected to a trigger (not illustrated) of the gun such that when the trigger is pulled, trigger connection 202 may move and engage with switch 108 which causes switch 108 to send a signal to tracker interface 104 to indicate that the trigger has been pulled. According to one embodiment, switch 108 may be adjustably configured with a plurality of trigger pull distances. Box magazine 102 may be suitable for insertion into magazine wells of traditional guns. However, components of box magazine 102 may be modified for other types of weapons, such as an electronic control weapon, where a battery pack may be inserted into the magazine well instead of a magazine with bullets.

Figure 3:
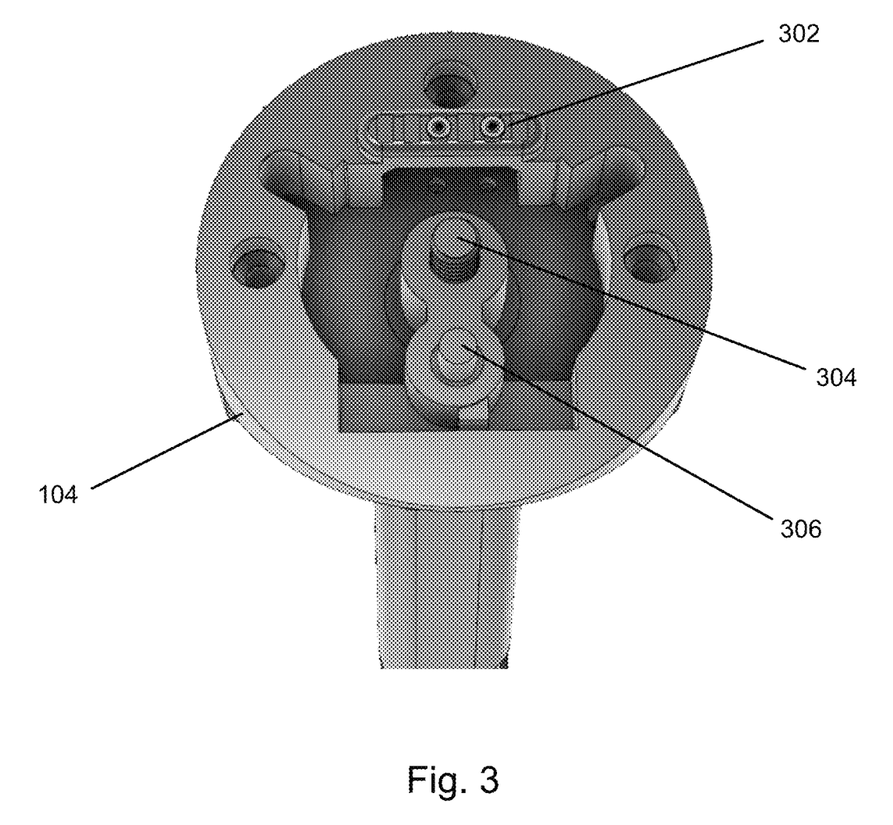
FIG. 3 illustrates a bottom view of a tracker interface according to an embodiment of the present invention.

FIG. 3 presents a bottom view of a tracker interface according to an embodiment of the present invention. Box magazine 102 may be assembled or attached to tracker interface 104. Tracker interface 104 may include pin pad 302, screwing bolt 304, and stabilizing pin 306. Pin pad 302 may include pins corresponding to given signals from switch 108 of box magazine 102. In the exemplary embodiment presented in FIG. 3, pin pad 302 includes two pins. For example, a first pin may correspond to a trigger pull signal and a second pin may correspond to a ground connection.

Figure 4:
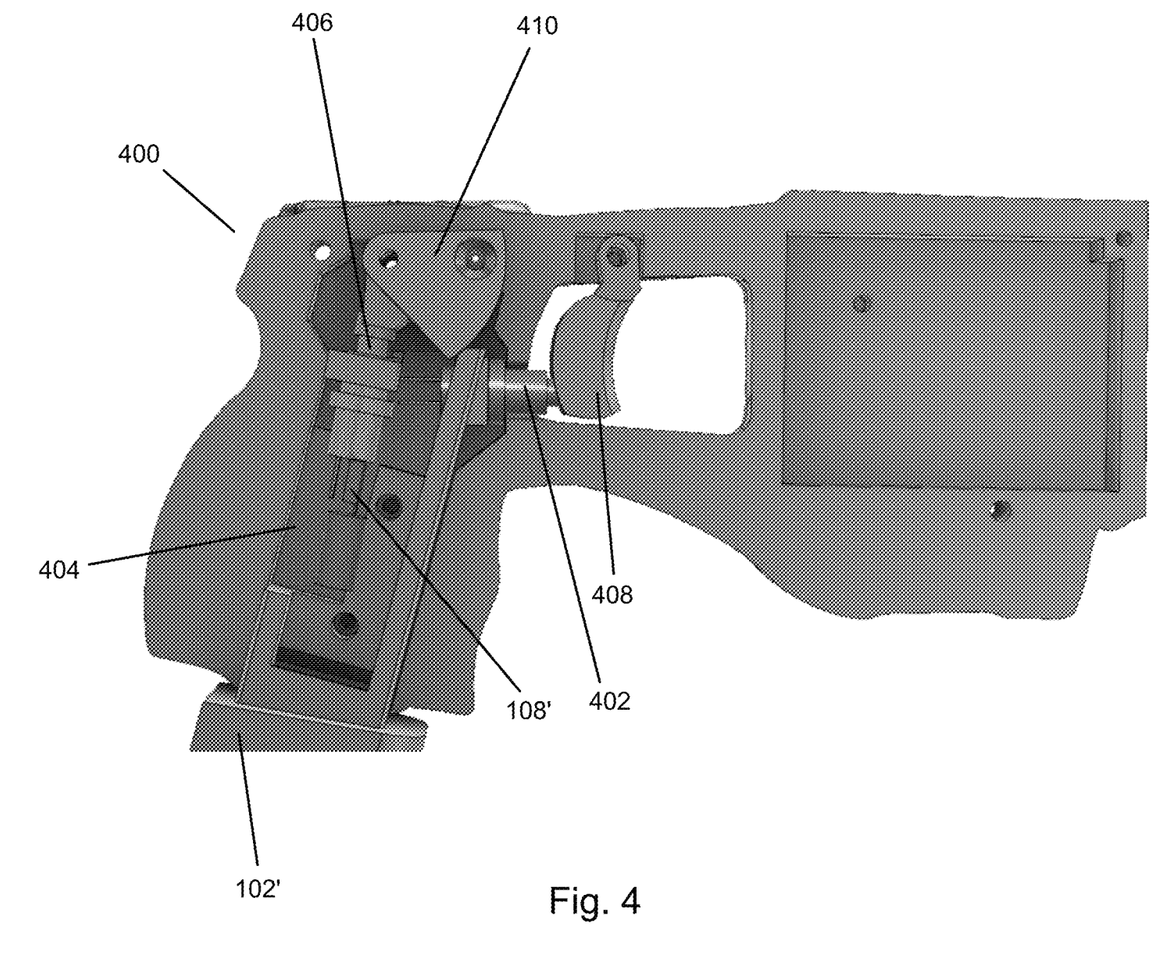
FIG. 4 illustrates a cutaway view of an electronic control weapon including a magazine simulator according to an embodiment of the present invention.

FIG. 4 presents a cutaway view of an electronic control weapon including a magazine simulator according to an embodiment of the present invention. Electronic control weapon 400 may include a magazine well 404 operable to receive a box magazine 102'. Box magazine 102' may include a switch 108' that may be actuated by trigger component 402 and a switch 110 operated by safety component 406. Safety component 406 may be correlated with on and off positions of a safety 410. Operation of the safety 410 may cause safety component 406 to transmit a signal to switch 110 that indicates the position of the safety 410 (e.g., either on or off). Trigger component 402 may be coupled to a trigger 408 of the electronic control weapon 400 such that when the trigger is pulled, trigger component 402 may communicate a signal to switch 108' that indicates the trigger 408 has been pulled. Switch 108' may relay signals from trigger component 402 and switch 110 may relay signals from safety component 406 to the tracker interface 104' illustrated in FIG. 5. Electronic control weapon 400 may further include a weight 112 that provides a weight and feel of a realistic (e.g., electronic) weapon.

Figure 5:
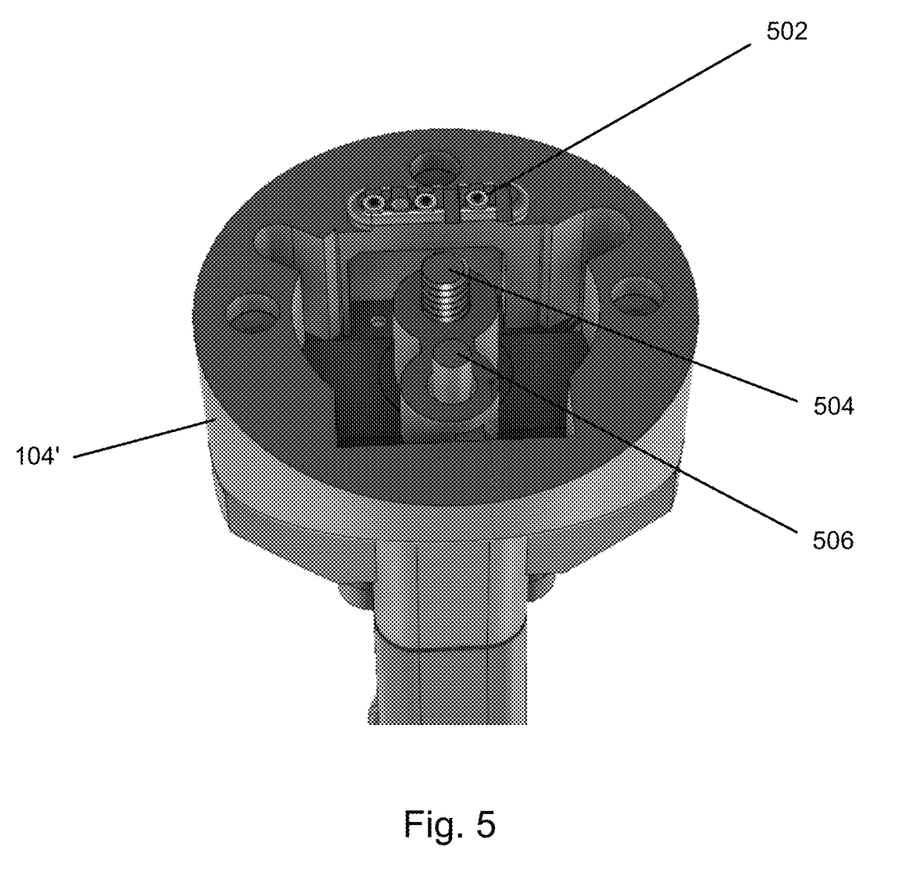
FIG. 5 illustrates a bottom view of a tracker interface according to another embodiment of the present invention.

FIG. 5 presents a bottom view of a tracker interface according to another embodiment of the present invention. Box magazine 102' may be assembled or attached to tracker interface 104'. Tracker interface 104' includes pin pad 502, screwing bolt 504, and stabilizing pin 506. In this exemplary embodiment, pin pad 502 includes three pins, e.g., a first pin may correspond to a trigger pull signal, a second pin may correspond to a safety position, and a third pin may correspond to a ground connection. Pin pad 502 may include pins corresponding to given signals from switches 108' and 110 of box magazine 102'.

Signals from switches 108, 108', or 110 may be transmitted to tracker interfaces 104, 104', respectively, and activate corresponding electrical switches to pin pads 302 and 502. Articulations from gun 200 or electronic control weapon 400 that are communicated to any ones of switches 108, 108', or 110 are not limited to trigger pulls and safety positions and may include other actions, events or signals that may be generated from weapons. Pin pad 302 and 502 may provide an electrical connection interface with tracker 106.

Figure 6:
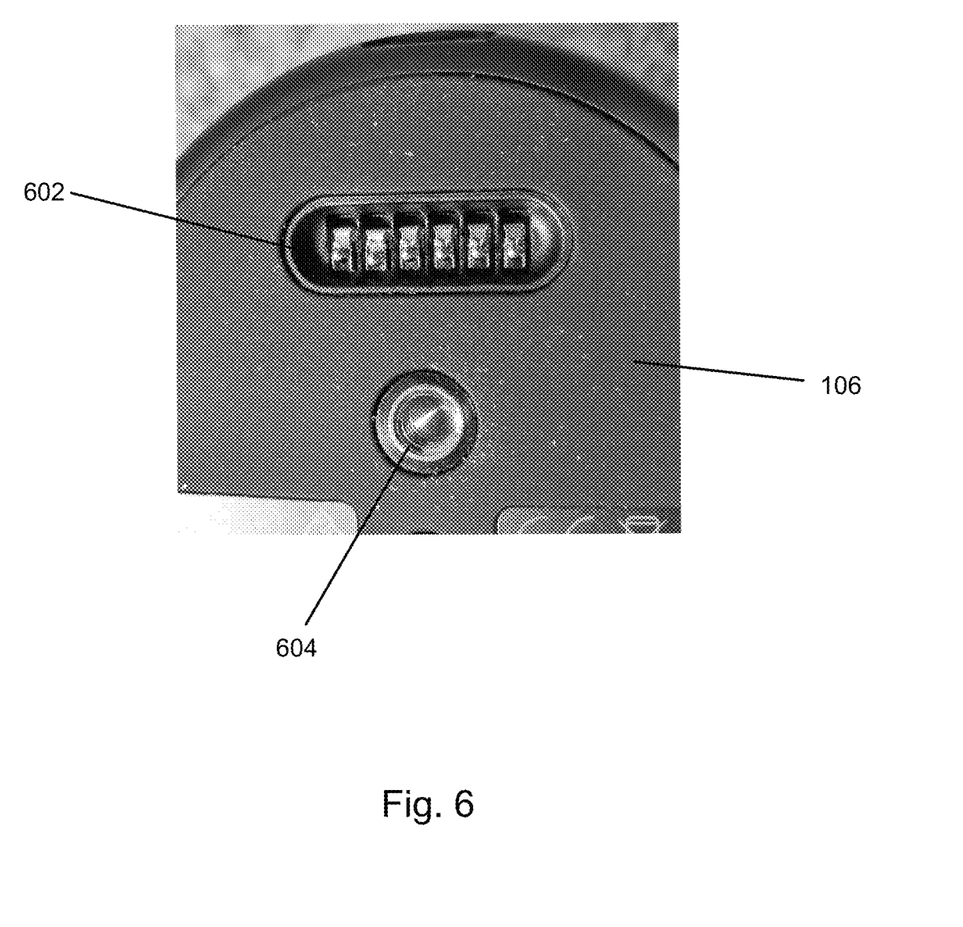
FIG. 6 illustrates a tracker according to an embodiment of the present invention.

FIG. 6 presents a tracker according to an embodiment of the present invention. Tracker 106 may comprise hardware configured to track and link actions, events or signals from gun 200 or electronic control weapon 400 to a virtual reality computing device. Tracker interfaces 104, 104' may be attached to tracker 106 to facilitate communications between gun 200 or electronic control weapon 400 and a virtual reality computing device, wirelessly. According to one embodiment, the virtual reality computing device may comprise a server running a Unity engine (Unity Technologies) that is interface with a tracker 106 that includes hardware, software, and software development tools from virtual reality providers such as VIVE™.

Signals from pin pads 302 and 502 on tracker interfaces 104 and 104' may be convey to tracker 106 via pogo pin connector 602. Pogo pin connector 602 may comprise a plurality of spring-loaded pins that support electrical connection with pins on pin pads 302, 502. Signals from the pins on pin pads 302, 502 may be mapped into commands based on contact connections with corresponding pins on pogo pin connector 602. The commands generated on tracker 106 may be received and interpreted by the virtual reality computing device.

Tracker interfaces 104 and 104' may be mated with tracker 106 by inserting stabilizing pin 306 and 506, respectively, into a stabilizing pin recess (not illustrated) of tracker 106. The stabilizing pins 306, 506 provide proper alignment and contact between pin pads 302, 502 and pogo pin connector 602. Tracker 106 may further include image sensors and/or non-optical sensors (e.g., utilizing sound waves or magnetic fields) that can be installed in hardware to track the movement of a user's body. According to another embodiment, optical markers may be placed on tracker 106 (or alternatively on magazines 102, 102', or tracker interfaces 104, 104') for motion tracking using cameras to track movement of a user.

Figure 7:
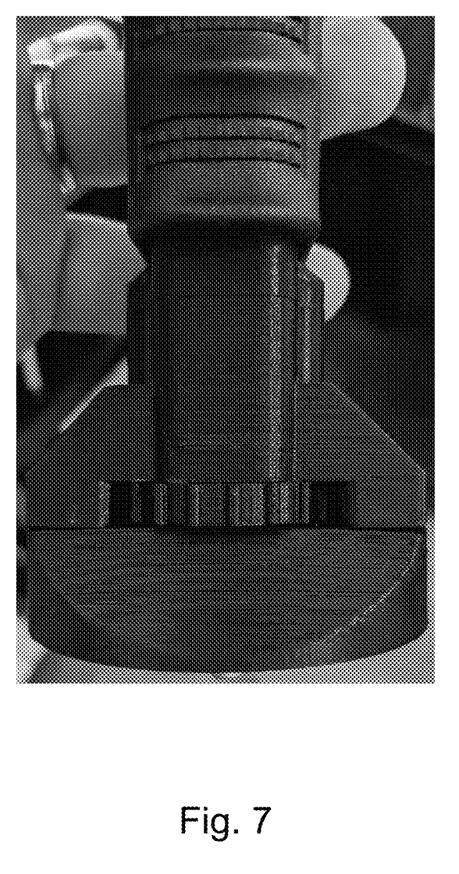
FIG. 7 illustrates a front handle view of a handgun loaded with a magazine assembly according to an embodiment of the present invention.

Tracker interfaces 104, 104' may be secured to tracker 106 by securing screwing bolts 304, 504 to mount 604. Screwing bolts 304, 504 may be tightened and loosened from mount 604 via a thumbwheel 114 as illustrated in FIG. 7. FIG. 7 illustrates a front handle view of a gun loaded with a magazine assembly according to an embodiment of the present invention. The thumbwheel may be tightened until the tracker interface (104, 104') is securely fixed in place with tracker 106. As such, an assembly of box magazine 102, 102', tracker interface 104, 104, and tracker 106 provides a magazine simulator 100 provides a virtual reality controller device that can be holstered and unholstered, useful in simulating real training.

Figure 8:
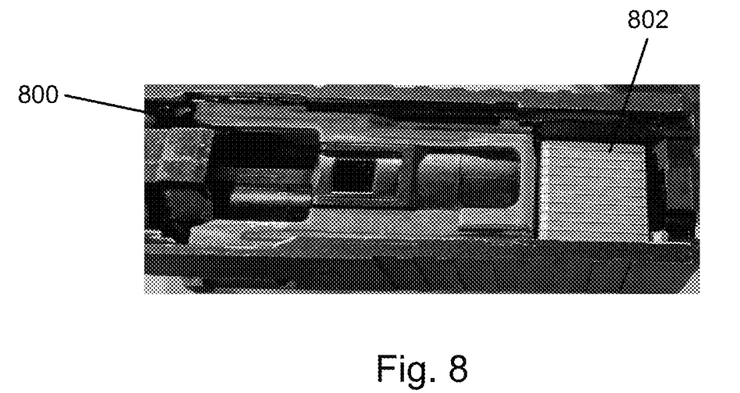
FIGS. 8 and 9 illustrate repeater mechanisms according to embodiments of the present invention.
Figure 9:
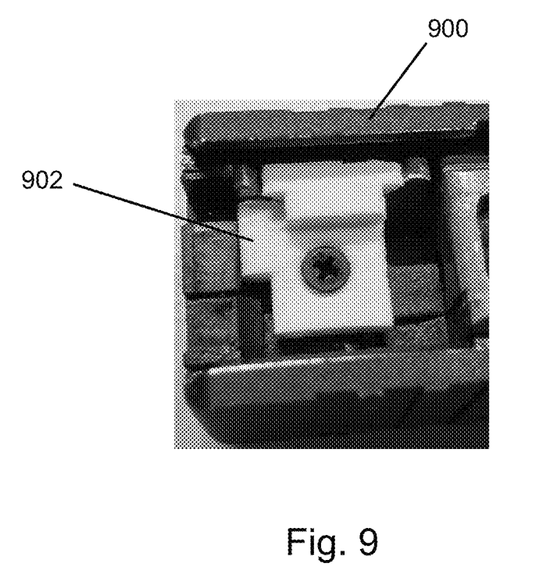

FIG. 8 presents a repeating mechanism according to an embodiment of the present invention. Certain guns may include a slide lock or release that functions to lock a slide in its "back" position when a gun has expended all ammunition from a magazine. To prohibit a gun from locking its slide, a repeater 802 may be inserted into a slide 800 of a gun. The repeater 802 may disable a slide lock or slide release to prohibit the slide 800 from locking upon firing with an empty magazine (e.g., box magazine 102, 102'). Furthermore, the repeater 802 may ensure the trigger of the gun is reset. That is, after firing, the trigger may be either held in position or goes limp/disconnected. When the slide 800 cycles due to firing, the trigger can be reset so that the gun may fire again. The repeater 802 in this case prevents the "dead trigger" so that the trigger of the gun can be pulled repeatedly without the slide 800 cycling. Similarly, FIG. 9 depicts a repeater 902 comprising a fitted piece that may be secured to slide 900.

Figure 10:
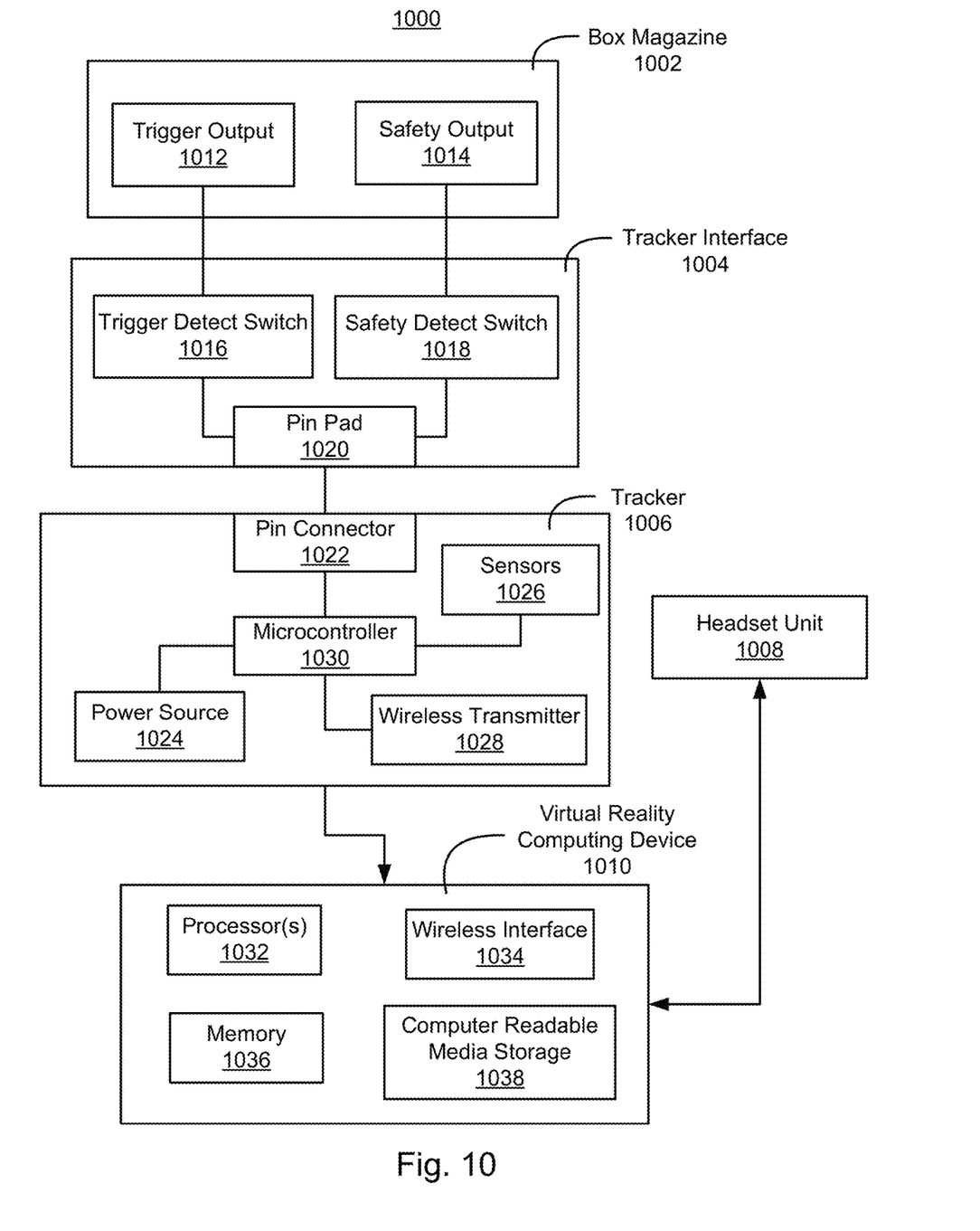
FIG. 10 illustrates a computing system according to an embodiment of the present invention.

FIG. 10 presents a computing system according to an embodiment of the present invention. A system 1000 may include box magazine 1002, tracker interface 1004, tracker 1006, headset unit 1008, and virtual reality computing device 1010. Box magazine 1002 may comprise a housing insertable into a magazine well of a gun and include a trigger detect switch 1016 and safety detect switch 1018. The trigger detect switch 1016 and safety detect switch 1018 may provide electrical connections or signals to indicate a pull of a trigger or a position of a safety, respectively.

The box magazine 1002 may be coupled to tracker interface 1004. The tracker interface 1004 may include trigger output 1012 and safety output 1014. Trigger detect switch 1016 may include a circuit component that opens and closes an electrical circuit to trigger output 1012. Similarly, safety detect switch 1018 may include a circuit component that opens and closes an electrical circuit to safety output 1014. According to other embodiment, trigger detect switch 1016 and safety detect switch 1018 may be in another housing that is coupled to box magazine 1002, or tracker interface 1004, or both. The electrical connections or signals corresponding to trigger output 1012 and safety output 1014 may be carried to given pins on pin pad 1020.

Tracker interface 1004 may be further coupled to tracker 1006. Tracker 1006 includes pin connector 1022, power source 1024, sensors 1026, wireless transmitter 1028, and microcontroller 1030. Pin pad 1020 may be communicatively or electrically connected to pin connector 1022. Power source 1024 may be connected to microcontroller 1030 and used by microcontroller 1030 to provide a voltage source to components within box magazine 1002 and tracker interface 1004 via pin connector 1022. As such, microcontroller 1030 may receive signals from closed electrical circuits connected to pin connector 1022 and transmit the signals to virtual reality computing device 1010 via wireless transmitter 1028. Virtual reality computing device 1010 may process or render the signals using processor(s) 1032 and transmit corresponding images to headset unit 1008 from wireless interface 1034.

Microcontroller 1030 may also provide power to sensors 1026 and wireless transmitter 1028 from power source 1024. Sensors 1026 can detect a position of tracker 1006 within the x, y and z coordinates of a space, as well as orientation including yaw, pitch and roll. From a user's perspective, a gun connected to tracker 1006 may be tracked when pointed up, down, left and right, tilted at an angle, or moved forward or backwards. Sensors 1026 may communicate where the gun is oriented to microcontroller 1030 which sends the data to virtual reality computing device 1010 for processing by processor(s) 1032 and renders corresponding images for transmission by wireless interface 1034 to headset unit 1008.

Headset unit 1008 may comprise a head mounted display, also including components similar to tracker 1006, that a user can place over the user's eyes. The headset unit 1008 may be configured to communication with the virtual reality computing device 1010 to provide display according to a virtual reality simulation program. Additionally, the headset unit 1008 may be configured with positioning and/or motion sensors to provide user motion inputs to virtual reality computing device 1010. When wearing the headset unit 1008, the view may shift as the user looks up, down, left and right. The view may also change if the user tilts their head at an angle or move their head forward or backward without changing the angle of gaze. Sensors on headset unit 1008 may communicate to processor(s) 1032 where the user is looking, and the processor(s) 1032 may render corresponding images to the head mounted display. Sensors, as disclosed herein, can detect signals of any form, including electromagnetic signals, acoustic signals, optical signals and mechanical signals.

Virtual reality computing device 1010 includes processor(s) 1032, wireless interface 1034, memory 1036, and computer readable media storage 1038. Processor(s) 1032 may be configured to execute virtual reality training software stored within memory 1036 and/or computer readable media storage 1038, to communicate data to and from memory 1036, and to control operations of the virtual reality computing device 1010. The processor(s) 1032 may comprise central processing units, auxiliary processors among several processors, and graphics processing units. Memory 1036 may include any one or combination of volatile memory elements (e.g., random access memory (RAM). Computer readable media storage 1038 may comprise non-volatile memory elements (e.g., read-only memory (ROM), hard drive, etc.). Wireless interface 1034 may comprise a network device operable to connect to a wireless computer network for facilitating communications and data transfer with tracker 1006 and headset unit 1008.

The virtual reality training software may comprise an audio/visual interactive interface that enables a trainee to interact with a three-dimensional first-person-view environment in training scenarios with tracker devices, such as a weapon including a virtual reality-enabled magazine assembly (e.g., comprising box magazine 1002, tracker interface 1004, and tracker 1006). Virtual reality computing device 1010 may receive signals or commands from tracker 1006 and headset unit 1008 to generate corresponding data (including audio and video data) for depiction in the virtual reality environment.

The disclosed embodiments with reference to FIGS. 1 through 10 depict exemplary weapon devices and hardware that may be used with the disclosed system. However, the disclosed system is compatible with other weapons, magazine simulators, or interface devices.

In certain embodiments, a tracker comprises a threaded insert for mounting to accessories (e.g., a weapon), similar to standard camera tripod mounts. A threaded insert mount requires a screw or other fastener to attach the tracker to the accessory. Such a mounting mechanism becomes inconvenient on small accessories where the tracker may be much larger than the accessory itself. Another drawback is that the screw may compete for space with a critical part of the accessory.

Figure 11:
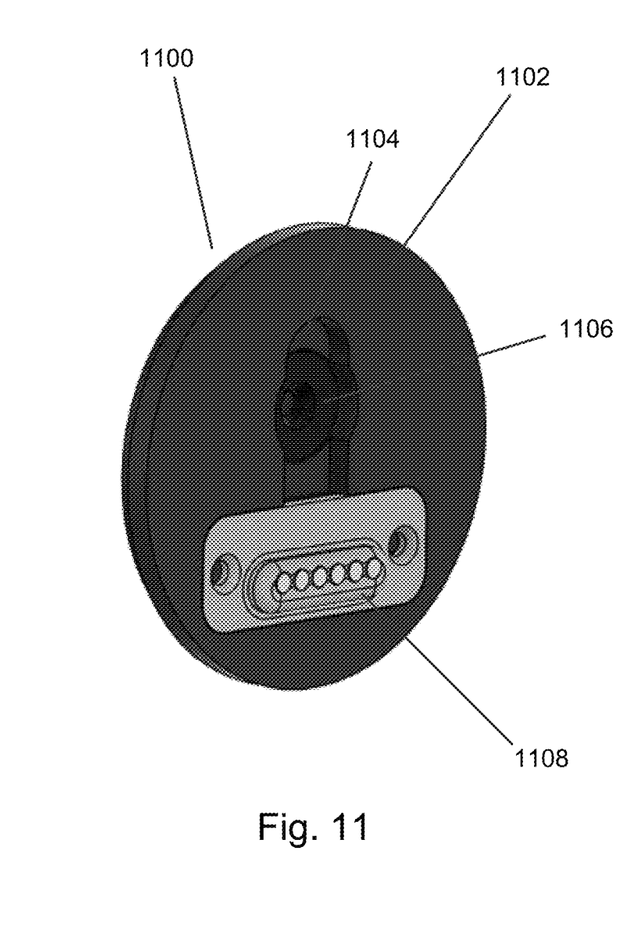
FIG. 11 illustrates a tracker interface according to an embodiment of the present invention.

The present application discloses a magnetic tracker mount comprising a tracker interface and a tracker. FIG. 11 presents a tracker interface according to an embodiment of the present invention. A tracker interface 1100 comprises hardware and circuitry for adapting a weapon to a tracker that facilitates communications between the weapon and a virtual reality computing device, wirelessly. The tracker interface 1100 includes a base plate 1102 that is configurable to the tracker. The base plate 1102 includes a groove 1104 and a pin pad 1108. The groove 1104 comprises a female socket configured to receive a metallic connector of a tracker. The groove 1104 includes a magnet 1106 for attraction with the metallic connector of the tracker.

Pin pad 1108 includes pins that are used to establish electrical or signal connections with a pogo pin connector of the tracker. Signals from the pins on pin pad 1108 may be mapped into commands based on contact connections with corresponding pins on the tracker. That is, the pin pad 1108 may include a first pin corresponding to a trigger pull signal, a second pin corresponding to a selective fire or safety signal, and a third pin corresponding to a ground connection. The pin pad 1108 may further include pins corresponding to other actions, events, or signals that may be generated from the box magazine or weapon.

Figure 12:
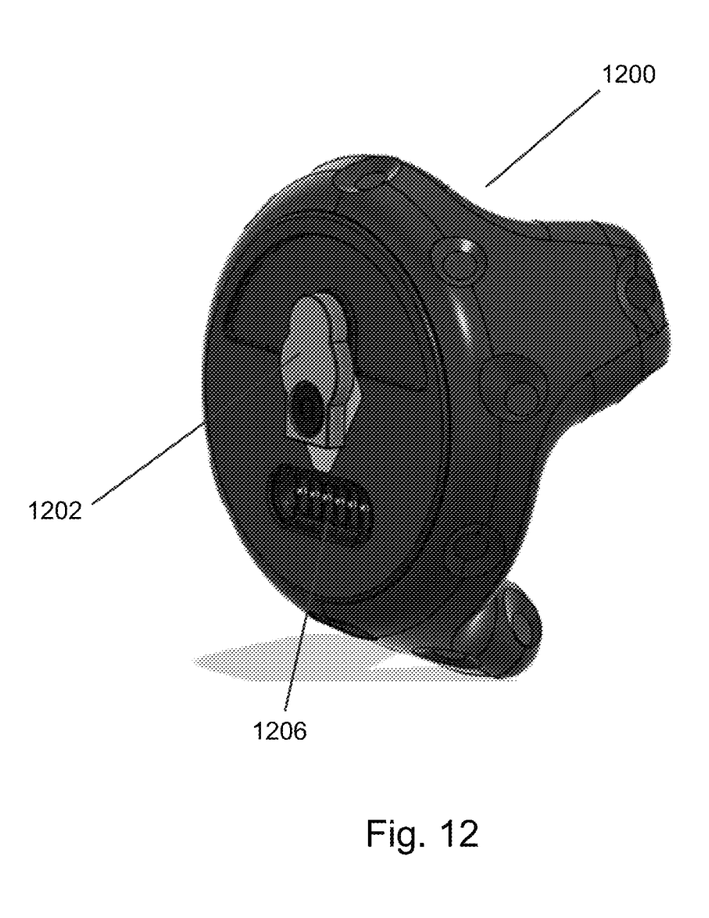
FIG. 12 illustrates a tracker according to an embodiment of the present invention.

FIG. 12 presents a tracker according to an embodiment of the present invention. Tracker 1200 comprises hardware configured to receive, track and link actions or events associated with signals from a gun magazine or weapon via the tracker interface 1100 and transmit the signals to a virtual reality computing device. The tracker 1200 includes a catch plate 1202, fulcrum 1204, and pogo pin connector 1206. Catch plate 1202 may be secured to tracker 1200 via a screw, bolt, or any other fastener. The catch plate 1202 may comprise ferromagnetic material, such as iron, cobalt, nickel, and alloys thereof. The tracker 1200 can be attached to the tracker interface 1100 by inserting catch plate 1202 into groove 1104 which causes a magnetic attraction to magnet 1106.

The usage of magnet 1106 allows for attachment of smaller accessories (e.g., weapon) and allows for easier interchanging of trackers. Furthermore, the tracker 1200 is separable from tracker interface 1100 such that the chances of an accessory attached to the tracker 1200 of breaking if dropped is decreased. Groove 1104 provides and assists in proper alignment and contact of pogo pin connector 1206 with pin pad 1108 when attaching tracker 1200 to tracker interface 1100. Pogo pin connector 602 may comprise a plurality of spring-loaded pins for placing in contact with pins on pin pad 1108 to transfer signals from the gun magazine or weapon to the tracker 1200. Commands or signals received by the tracker 1200 may be received and interpreted by a virtual reality computing device.

Figure 13:
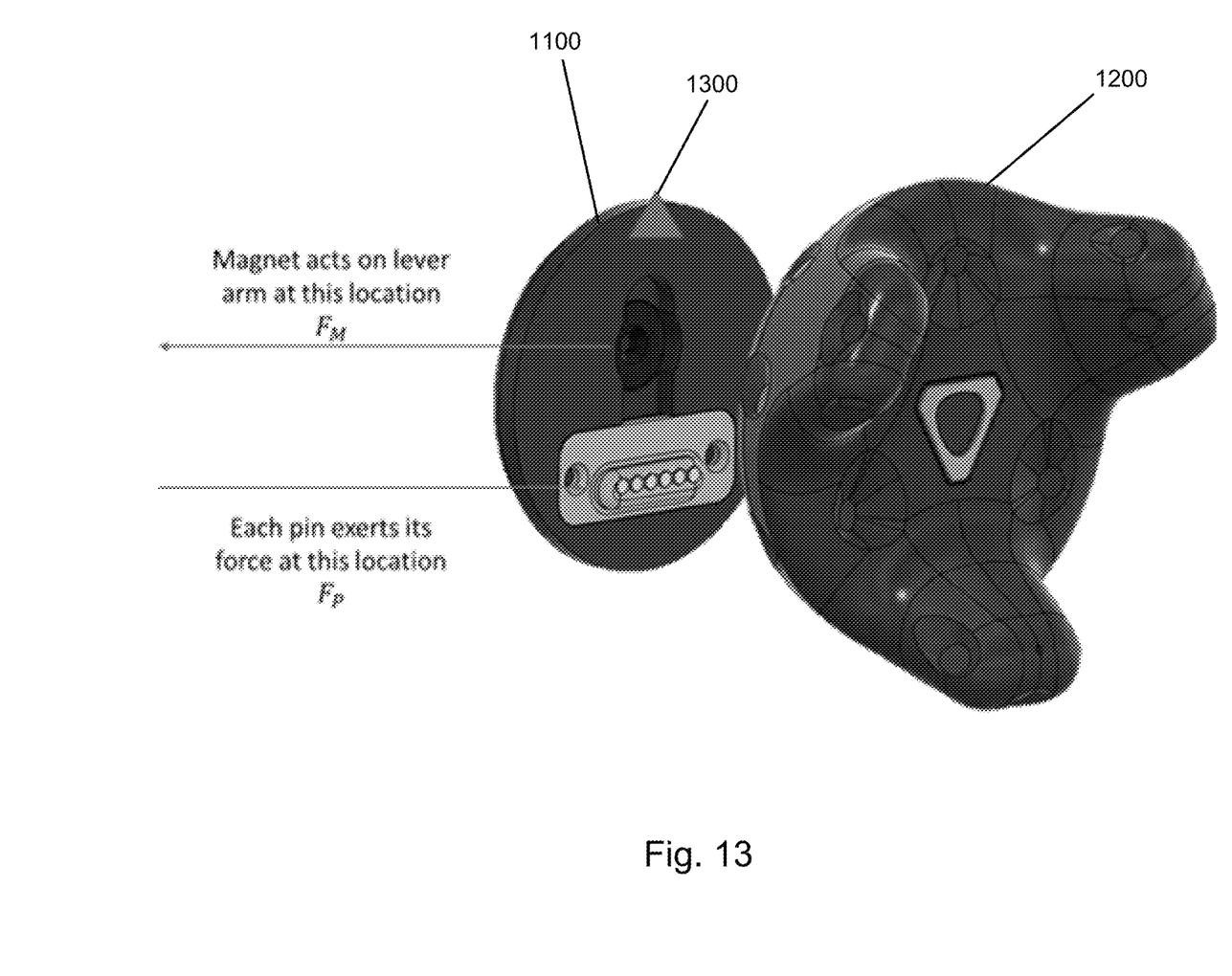
FIGS. 13 and 14 present an exemplary calculating of force for compressing a pogo pin connector according to an embodiment of the present invention.
Figure 14:
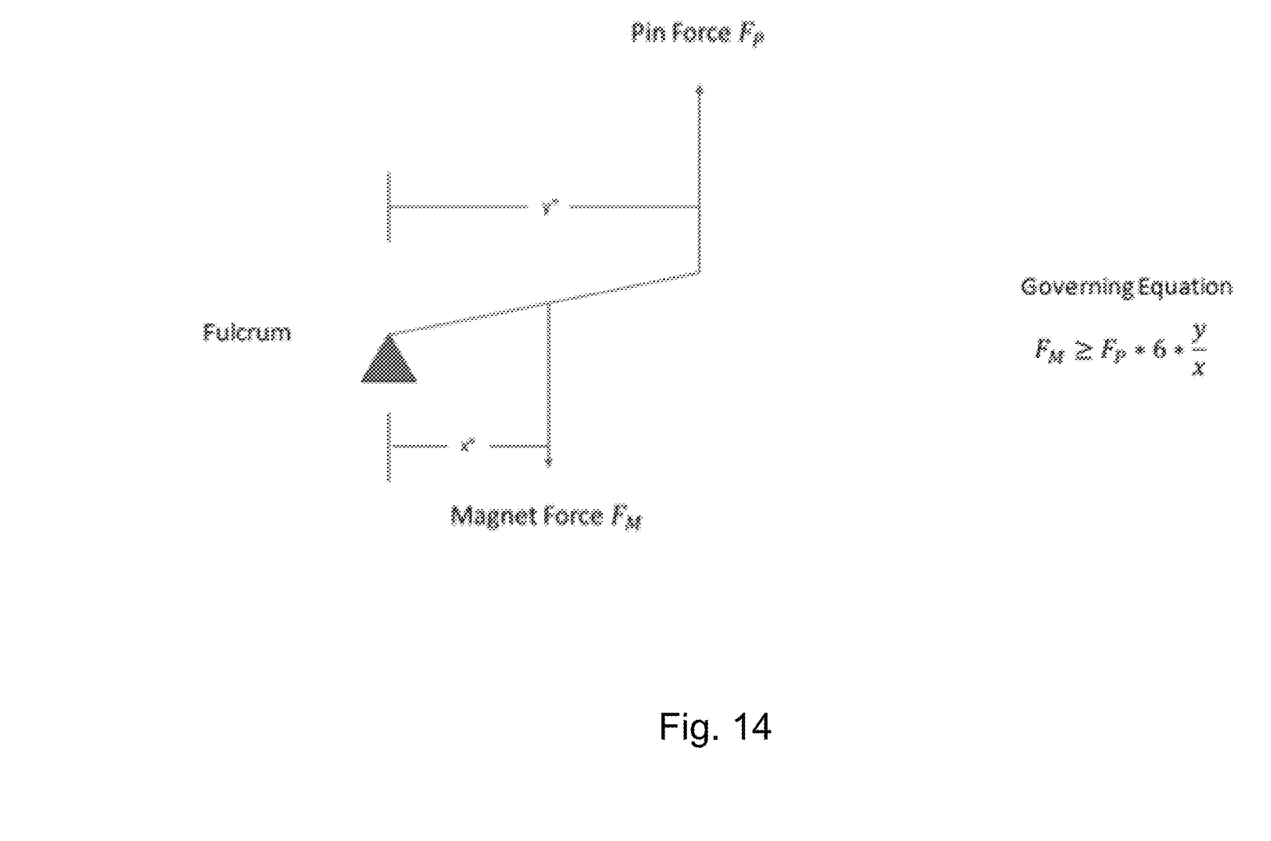
Figure 15:
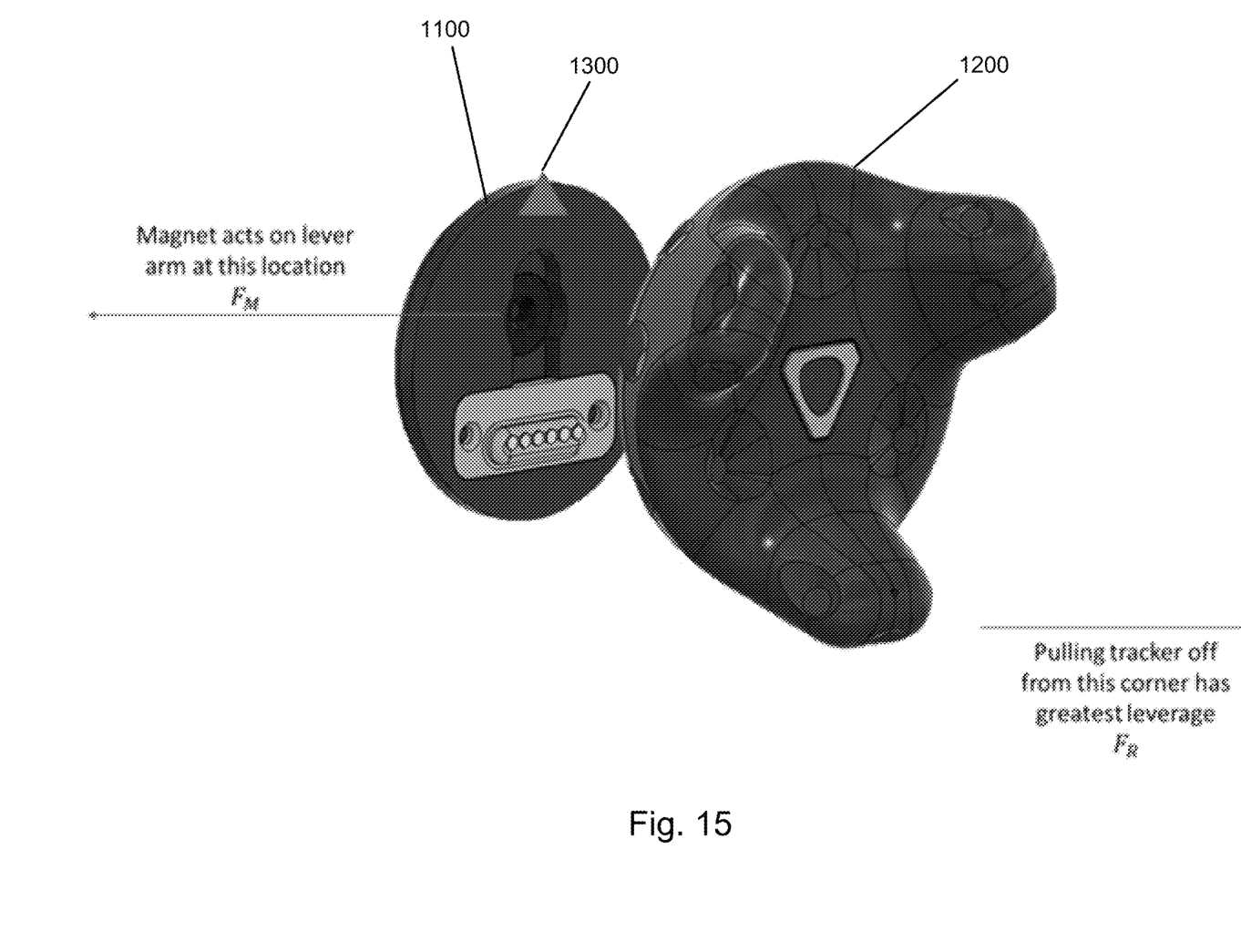
FIGS. 15 and 16 present an exemplary calculating of removal force of a tracker from a tracker interface according to an embodiment of the present invention.
Figure 16:
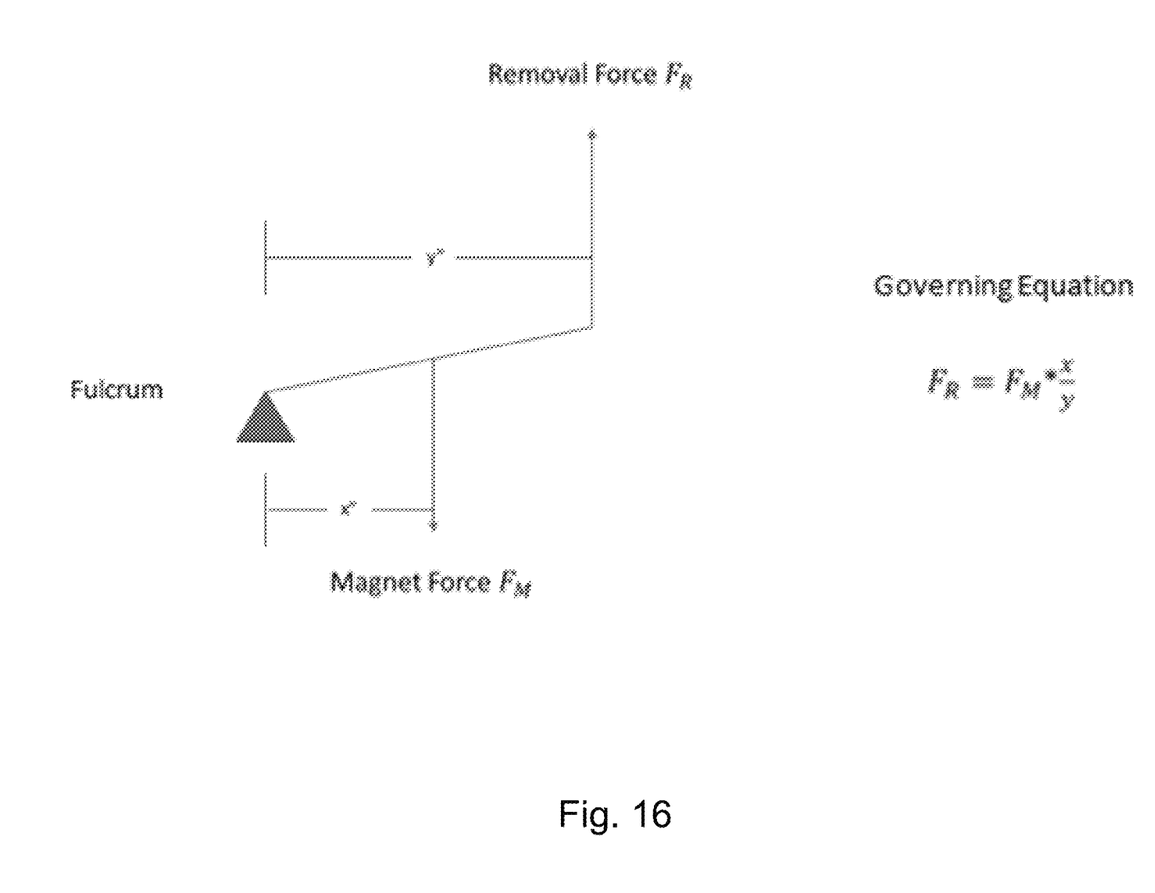

FIGS. 13 and 14 present an exemplary calculating of force for compressing a pogo pin connector according to an embodiment of the present invention. A fulcrum 1300 may be used to determine an appropriate magnet strength that the magnet 1106 would need to exert to compress the pogo pin connector 1206 and how the tracker 1200 sits on the magnet 1106 and pogo pin connector 1206. Simplified models consisting of second and third class levers may be used to determine an appropriate magnet strength on the tracker interface. The magnet strength may be a critical parameter that affects compression of the pogo pin connector 1206 as well as the effort required to remove the tracker 1200 from the tracker interface 1100. FIGS. 15 and 16 present an exemplary calculating of removal force of a tracker from a tracker interface according to an embodiment of the present invention.

FIGS. 1 through 16 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A magnetic tracker mount comprising:
   a tracker interface configured to adapt a weapon to a tracker that facilitates communications between the weapon and a virtual reality computing device, the tracker interface comprising a base plate including:
   a groove comprising a female socket configured to receive a catch plate of the tracker, the groove including a magnet that attracts to the catch plate, and
   a pin pad including pins configured to establish signal connections with the tracker, the pins transmitting signals from the weapon to the tracker.

2. The magnetic tracker mount of claim 1 wherein the catch plate comprises ferromagnetic material.

3. The magnetic tracker mount of claim 1 wherein the groove assists with proper alignment and contact of the pin pad with a pogo pin connector of the tracker.

4. The magnetic tracker mount of claim 1 wherein the signals are mapped into commands based on contact connections with corresponding pins on the tracker.

5. A magnetic tracker mount comprising:
   a tracker comprising hardware configured to receive signals from a weapon via a tracker interface and transmit the signals to a virtual reality computing device, the tracker comprising:
   a catch plate configured for insertion into a groove of the tracker interface, the groove including a magnet that attracts to the catch plate, and
   a pogo pin connector including a plurality of pins placed in contact with pins on a pin pad of the tracker interface to transfer the signals from the weapon to the tracker.

6. The magnetic tracker mount of claim 5 wherein the magnet is secured to the tracker by at least a screw or a bolt.

7. The magnetic tracker mount of claim 5 wherein the plurality of pins comprise a plurality of spring-loaded pins.

* * * * *